(12) United States Patent
Rangaraj (10) Patent No.: US 10,997,594 B2
(45) Date of Patent: May 4, 2021

(54) SYSTEMS AND METHODS FOR PROVIDING TOKENIZATION SERVICES AT A MOBILE DEVICE

(71) Applicant: PayPal, Inc., San Jose, CA (US)

(72) Inventor: Srinivasan Rangaraj, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 82 days.

(21) Appl. No.: 16/021,946

(22) Filed: Jun. 28, 2018

(65) Prior Publication Data
US 2020/0005294 A1 Jan. 2, 2020

(51) Int. Cl.
*G06Q 20/40* (2012.01)
*G06Q 20/32* (2012.01)
*H04L 29/08* (2006.01)

(52) U.S. Cl.
CPC ......... *G06Q 20/40* (2013.01); *G06Q 20/3226* (2013.01); *H04L 67/10* (2013.01); *H04L 67/20* (2013.01)

(58) Field of Classification Search
None
See application file for complete search history.

(56) References Cited

U.S. PATENT DOCUMENTS

| 8,437,531 B2 | 5/2013 | Jones et al. |
| 8,452,704 B2 | 5/2013 | Barbara et al. |
| 2013/0024933 A1 | 1/2013 | Jakobsson et al. |
| 2013/0198071 A1* | 8/2013 | Jurss ................... G06Q 20/227 705/42 |
| 2013/0246280 A1 | 9/2013 | Kirsch |
| 2016/0212129 A1* | 7/2016 | Johnston ............... G06F 21/40 |
| 2019/0340398 A1* | 11/2019 | Mosteller ............ G06Q 20/355 |

FOREIGN PATENT DOCUMENTS

CA 2174744 4/1995

* cited by examiner

*Primary Examiner* — Joseph W. King
*Assistant Examiner* — Amit Patel
(74) *Attorney, Agent, or Firm* — Haynes and Boone, LLP (57) ABSTRACT

A method is provided that includes assigning one or more first records of a first table and one or more second records of a second table to corresponding range groups of a plurality of range groups. The method further includes comparing at least one record of the first table with at least one record of the second table, where the at least one record of the first table and the at least one record of the second table are assigned to a first range group of the plurality of range groups. The method also includes, based on the comparing, identifying a parent record and a child record and segmenting the parent record based on the child record. Further, the method includes subsequent to the segmenting the parent record, performing a join operation on the first table and the second table.

20 Claims, 5 Drawing Sheets

FIG. 5

SYSTEMS AND METHODS FOR PROVIDING TOKENIZATION SERVICES AT A MOBILE DEVICE

BACKGROUND

Tokenization is widely used to securely conduct digital payment transactions today. Typically, a third-party token service provider may be used to generate and manage payment tokens. To this end, token service providers store mappings between tokens and account number of payment instruments. These mappings (and therefore the account numbers) can be vulnerable to being stolen in the event that a security flaw with computers of the token service provided is exploited.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Systems and methods are provided for providing tokenization services at a mobile device. In typical tokenization frameworks, a token service provider is an entity that generates tokens for payment transactions between customers and merchants. The token service provider can be a separate and distinct entity communicating with other devices in the payment network or may be integrated within the payment network itself. The TSP performs tokenization to replace card numbers (e.g., primary account numbers (PANs)) of credit cards, gift cards, or other payment instruments with a surrogate value, such as a token. The TSP generates and manages the tokens and stores a mapping between the tokens and the PANs in a secure vault. When a payment transaction is initiated, a consumer or merchant device provides a payment token to the TSP, and the TSP detokenizes the token to determine the PAN associated with the token. The PAN is then transmitted to an issuer of the payment instrument, and the issuer then determines whether the payment transaction is authorized.

However, the TSPs' storage of the mappings between tokens and PANs can be a security vulnerability in certain cases. Further, the transmission of the PAN to the issuer can also be a liability. For example, if a TSP is hacked, its mappings between tokens and associated PANs can be revealed and used for fraudulent purposes. The possibility of a malicious actor intercepting the communication of the PAN from the TSP to the issuer also exists. Thus, certain embodiments described herein provide a secure system for tokenization that eliminates these security flaws.

According to one embodiment, a mobile device of a consumer may determine an account number of a payment instrument associated with the consumer. For instance, the consumer may use the mobile device to take an image of a credit card via a camera. The mobile device may perform an image recognition process to determine the account number based on the image. Based on the account number, the mobile device may identify and issuer of the payment instrument and an issuance server associated with the issuer. In other implementations, the mobile device may identify the issuer and issuance server based on the image of the payment instrument, such as by identifying a logo associated with the issuer.

In response to determining the account number, the mobile device may generate a unique digital key by applying a transformation function to the account number. The transformation function may be a hash of the account number or other type of algorithm that changes the account number into data that is unusable for payment outside except by the mobile device. Additionally, the mobile device may store, in a secure element on the mobile device, an association or mapping between the unique digital key and a payment identifier associated with the payment instrument. Further, the mobile device may transmit an indication to the issuance server of the association between the unique digital key and the payment identifier being stored at the mobile device.

Further, the indication may include a device identifier associated with the mobile device and the token. In certain implementations, the indication may cause the issuance server to store and/or map an association between the device identifier, the unique digital key, and the account number. For instance, upon receiving the indication, the issuance server may derive the account number from the token. As such, the transformation function used to generate the token may be reversible, and only the mobile device and the issuance server may have knowledge of the transformation function.

According to a particular embodiment, subsequent to generating the token, the mobile device may be configured to delete the account number from its memory. For instance, the mobile device may identify a memory address range corresponding to a memory location of where the account number is temporarily stored. Further, the mobile device may overwrite the memory address range with random data that is different than the account number. As a result, only the issuance server stores or is configured to store the account number, which precludes a need to store the account number with a third-party, such as a third-party token service provider.

Subsequently, a payment transaction may be initiated (e.g., by the mobile device or a merchant device in communication with the mobile device) that requests usage of the payment instrument for payment. As a result, the mobile device may access the token associated with the payment instrument and transmit a payment request that includes the token and the device identifier to an appropriate entity within the payment network. Eventually, the issuance server may receive the token and device identifier, which may cause the issuance server to perform a lookup in a table to determine the association between the token, the device identifier, and the account number of the payment instrument. Thus, the issuance server may identify the appropriate account number and subsequently perform and authorization process with respect to using the account number for payment of the payment transaction.

Figure 1:
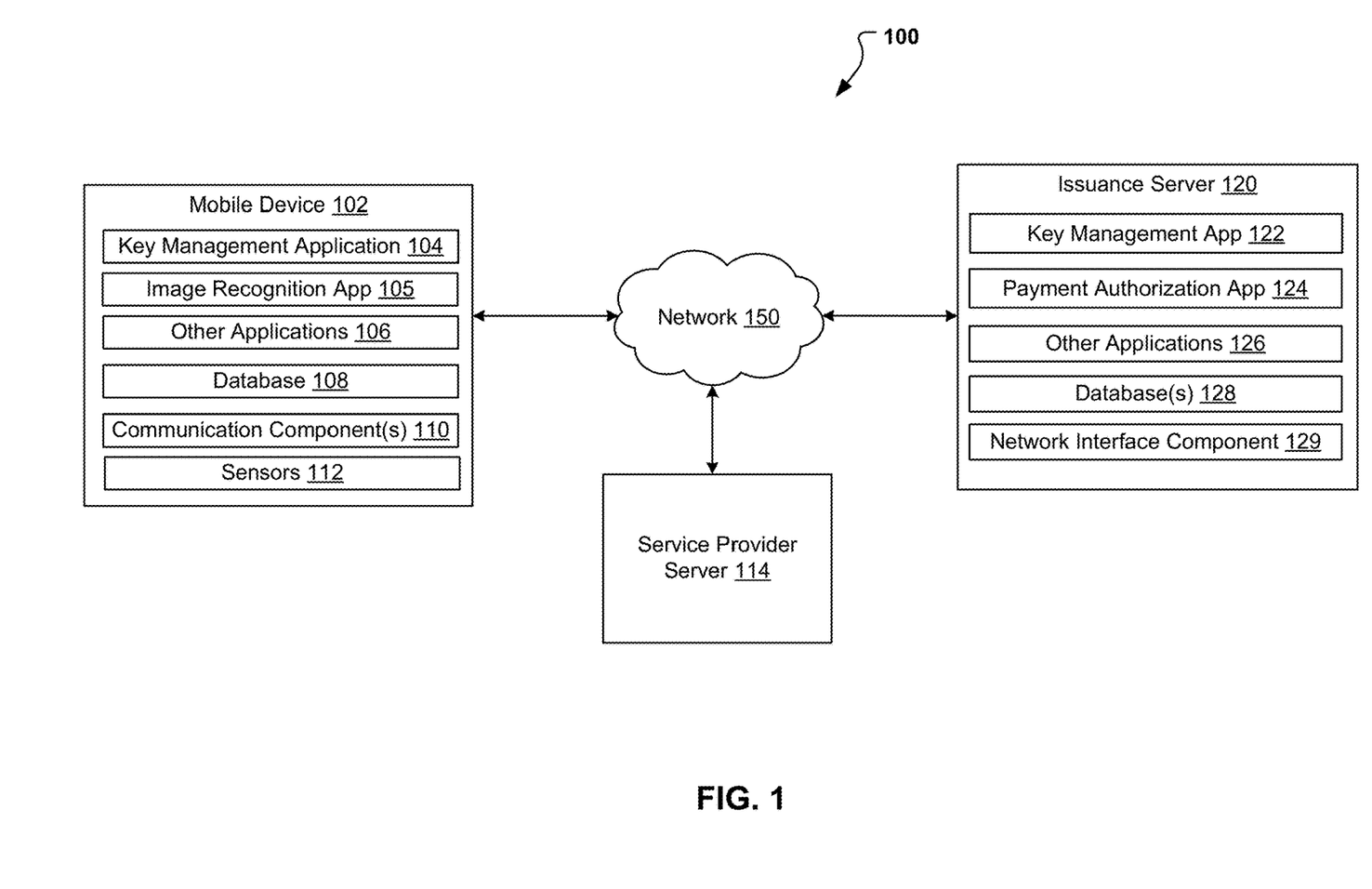
FIG. 1 is a block diagram of a networked system suitable for implementing the processes described herein for providing tokenization services at a mobile device.

FIG. 1 is a block diagram of a networked system 100 for implementing the processes described herein, according to an embodiment. As shown, system 100 may include or implement a plurality of devices, computers, servers, and/or software components that operate to perform various methodologies in accordance with the described embodiments. Example devices, computers, and servers may include mobile devices, wearable devices, stand-alone devices, desktop computers, laptop computers, and enterprise-class servers, executing an operating system (OS) such as a MICROSOFT® OS, a UNIX® OS, a LINUX® OS, or another suitable device and/or server based OS. It will be appreciated that the devices, computers, and/or servers illustrated in FIG. 1 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 100 includes a mobile device 102 configured to communicate with a issuance provider server 120 over a network 150. The mobile device 102 and the issuance server 120 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 100, and/or accessible over network 150.

The mobile device 102 may be implemented as a communication device that may utilize appropriate hardware and software configured for wired and/or wireless communication with the issuance server 120. In certain implementations, the mobile device 102 may be a mobile phone, tablet, electronic wearable, laptop computer, and/or any other type of mobile computing device usable by a consumer. The mobile device 102 may be configured to accept various forms of payment including, but not limited to credit card payments, debit card payments, loyalty card payments, gift card payments, store card payments, and/or payment made by accessing a digital wallet.

The mobile device 102 may include a key management application 104, other applications 106, a database 108, communication components 110, and sensors 112. The key management application 104 and other applications 106 may correspond to executable processes, procedures, and/or applications with associated hardware. In other embodiments, mobile device 102 may include additional or different components having specialized hardware and/or software to perform operations associated with the key management application 104 and/or the other applications 106.

The key management application 104 may be provided and maintained by a service provider associated with a service provider server 114. In certain embodiments, the service provider may be a payment provide that provides and facilitates payments, such as for users of the key management application 104. The key management application 104 may be configured to generate a unique digital key based on an account number of a payment instrument.

As such, the key management application may receive and/or access an account number of a particular payment instrument. According to certain embodiments, the mobile device may be configured to capture an image of the payment instrument, such as via a camera (included in the sensors 112). The image recognition application 105 may access the image of the payment instrument and perform an image recognition process to determine an account number corresponding to the payment instrument. For example, the image recognition application 105 may be able to recognize the account number that is printed on, etched into, and/or otherwise indicated on the payment instrument. The image recognition application 105 may then provide the account number to the key management application 104.

Based on the account number, the key management application 104 may determine an issuer of the payment instrument. For example, the key management application 104 may determine an issuer identification number (IIN) or bank identification number (BIN) based on the first six or eight digits of the account number. The IINs and/or BINs (hereinafter referred to as issuer identifiers) may be linked to different issuance servers of respective issuers of various payment instruments. For instance, the mobile device 102 may store a mapping between issuer identifiers and respective issuance servers. Thus, based on an issuer identifier determined from an account number of a particular payment instrument, the key management application 104 may determine a corresponding issuance server to communicate with.

Additionally, the key management application 104 may be configured to apply a transformation function to the account number to generate a unique digital key. For instance, the transformation function may be a hash of the account number and/or another type of algorithm that is applied to the account number. The unique digital key is different from the account number. Furthermore, the key management application 104 may store, in a secure element of the mobile device 102, an association between the unique digital key and a payment identifier associated with the payment instrument. The payment identifier may be used to differentiate the payment instrument from other payment instruments included in a digital wallet. Further, the payment identifier may also include the issuer identifier of the user of the issuance server 120.

In addition, the key management application 104 may delete the account number from memory or other storage of the mobile device 102. For example, the key management application 104 may identify the memory address range associated with storage of the account number and overwrite the memory address range with random data. Thus, the account number is no longer stored at the mobile device 102, and if the security of the mobile device 102 is ever compromised, the account number will be unobtainable from the mobile device 102.

Further, the key management application 104 may transmit, to the issuance server 120, an indication of the unique digital key being stored at the mobile device. In some embodiments, the transmitted indication may include a device identifier association with the mobile device 102. As will be described further below, the transmission may cause the issuance server 120 to store an association between the device identifier and the unique digital key.

In certain embodiments, after generation and storage of the unique digital key at the mobile device 102, the mobile device may receive and/or initiate a request to complete a payment transaction. The request may indicate a selection of the payment instrument corresponding to the unique digital key to be used for payment for the payment transaction. For example, a user of the mobile device 102 may have selected the payment instrument to be used for payment transaction. The selection may cause the payment identifier associated with the payment instrument to be provided to the key management application 104. As such, the key management application 104 may be configured to perform a lookup in the secure element using the payment identifier. Based on the lookup and the mapping that was previously stored between the payment identifier and the unique digital key, the key management application 104 may identify the unique digital key.

Accordingly, the key management application 104 may transmit a payment authorization request to the issuance server 120 to authorize the payment transaction. The payment authorization request may include the unique digital key and the device identifier. As will be discussed in more detail below, based on the request, the issuance server 120 may be configured to derive the account number from the unique digital key and the device identifier and perform an authorization process with respect to the account number.

The mobile device 102 may execute the other applications 106 to perform various other tasks and/or operations corresponding to the mobile device 102. For example, the other applications 106 may include security applications for implementing client-side security features, programmatic client applications for interfacing with appropriate application programming interfaces (APIs) over network 150, or other types of applications. The other applications 106 may also include additional communication applications, such as email, texting, voice, and instant messaging (IM) applications that enable a user to send and receive emails, calls, texts, and other notifications through the network 150. In various embodiments, the other applications 106 may include location detection applications, such as a mapping, compass, and/or global positioning system (GPS) applications, which may be used to determine a location of the mobile device 102. The other applications 106 may include social networking applications. Additionally, the other applications 106 may include device interfaces and other display modules that may receive input and/or output information. For example, the other applications 106 may include a graphical (GUI) configured to provide an interface to the user.

In some embodiments, the other applications 106 may include a social media application that enables the user to interface with a social media platform provided by a third-party service provider. Further, the service provider may be integrated with the social media platform (and/or otherwise be in communication with the social media platform). For example, the issuance server 120 may be in communication with one or more servers or devices of the social media platform.

The mobile device 102 may further include a database 108, which may be stored in a memory, secure element, and/or other storage device of the mobile device 102. The database 108 may include, for example, identifiers (IDs) such as operating system registry entries, cookies associated with the digital wallet application 104 and/or other applications 106, IDs associated with hardware of the communication component 110, IDs used for payment/user/device authentication or identification, and/or other appropriate IDs. The database 108 may also include information corresponding to one or purchase transactions of the user who has purchased goods or services from one or more merchants, browsing histories of the user, or other types of user information. Further, the database 108 may store login credentials (e.g., such as to login to an account with the service provider and/or other accounts with other service providers), identification information, biometric information, and/or authentication information of the user. As previously discussed, the mobile device 102 may store an association between a unique digital key and a payment identifier associated with a payment instrument. As such, the association may be stored in the database 108, such as in the secure element.

The mobile device 102 may also include at least one communication component 110 configured to communicate with various other devices such as the other user devices 114 and/or the issuance server 120. In various embodiments, communication component 110 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

The mobile device 102 may also include one or more hardware sensors 112 to determine user inputs from the user, motion of the mobile device 102, biometric information associated with the user, and/or various environmental data associated with the mobile device 102. The sensors 112 may include, but are not limited to, gyroscopes, cameras, microphones, accelerometers, barometers, thermometers, compasses, magnetometers, light detectors, proximity sensors, fingerprint sensors, pedometers, and heart rate monitors.

The service provider server 114 may be may be maintained, for example, by the service provider, which may provide payment processing services for the merchant and/or users of the payment application 106. In one example, the service provider server 114 may be provided by PAYPAL, Inc. of San Jose, Calif. USA. However, in other embodiments, the service provider server 114 may be maintained by or include a financial service provider, social networking service, email or messaging service, media sharing service, and/or other service provider, which may provide payment processing services.

The issuance server 120 may be maintained, for example, by the issuer of the payment instrument. The issuance server 120 may provide authorizations for payment requests to use payment instruments issued by the user (e.g., credit cards, debit cards, gift cards, etc.). The issuance server 120 may be maintained by or include a financial service provider, social networking service, email or messaging service, media sharing service, and/or other service provider, which may provide payment processing services.

The issuance server 120 includes an account management application 122. The account management application 122 may be configured to communicate with the key management application 104 of mobile device 102. According to a particular embodiment, the account management application 122 may receive the indication (transmitted by the key management application 104 as previously discussed) of the unique digital key being stored at the mobile device 102. As described earlier, the indication may also include a device identifier associated with the mobile device 102. As a result of receiving the transmitted indication, the account management application may store, such as in a database (e.g., database 128), an association between the unique digital key and the device identifier. It will be appreciated that the issuance server 120 may store many such mappings between device identifiers of other devices and unique digital keys corresponding to other payment instruments issued by the issuer.

Further, as previously discussed, the key management application 122 may transmit a payment authorization request to the issuance server 120 with respect to a payment transaction that has been initiated. The payment authorization request may include the unique digital key associated with the payment instrument and the device identifier association with the mobile device 102. To this end, the key management application 122 may access the database 128 to determine whether the database 128 stores a mapping between a unique digital key and a device identifier that matches the unique digital key and the device identifier included in the payment authorization request. If so, the key management application 122 may derive the account number from the unique digital key by applying a second transformation function to the unique digital key that reverses the transformation function that was previously applied to the account number. After deriving the account number, the key management application 122 may provide the account number to the payment authorization application 124.

The payment authorization application 124 may evaluate information associated with the account number and the payment transaction to determine whether to authorization the payment authorization request. If the payment authorization application 124 authorizes the payment authorization request, the payment transaction may be completed.

The issuance server 120 may execute the other applications 126 to perform various other tasks and/or operations corresponding to the issuance server 120. For example, the other applications 126 may include security applications for implementing server-side security features, programmatic client applications for interfacing with appropriate application programming interfaces (APIs) over network 150, or other types of applications. The other applications 126 may also include additional communication applications, such as email, texting, voice, and instant messaging (IM) applications that enable a user to send and receive emails, calls, texts, and other notifications through the network 150. In various embodiments, the other applications 126 may include location detection applications, such as a mapping, compass, and/or global positioning system (GPS) applications. The other applications may 126 include social networking applications. Additionally, the other applications 126 may include device interfaces and other display modules that may receive input and/or output information. For example, the other applications 126 may include a GUI configured to provide an interface to a user.

The issuance server 120 may further include one or more databases 138, which may be stored in a memory and/or other storage device of the issuance server 120. The database(s) 138 may include, for example, IDs such as operating system registry entries, cookies associated with the transaction processing application 122, biometric information, IDs associated with hardware of the network interface component 129, IDs used for payment/user/device authentication or identification, and/or other appropriate IDs.

In various embodiments, the issuance server 120 also includes at least one network interface component 129 that is configured to communicate with the mobile device 102 and/or the other user devices 114 via the network 150. The network interface component 129 may comprise a DSL modem, an Ethernet device, a broadband device, a satellite device and/or various other types of wired and/or wireless network communication devices including microwave, RF, and IR communication devices.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
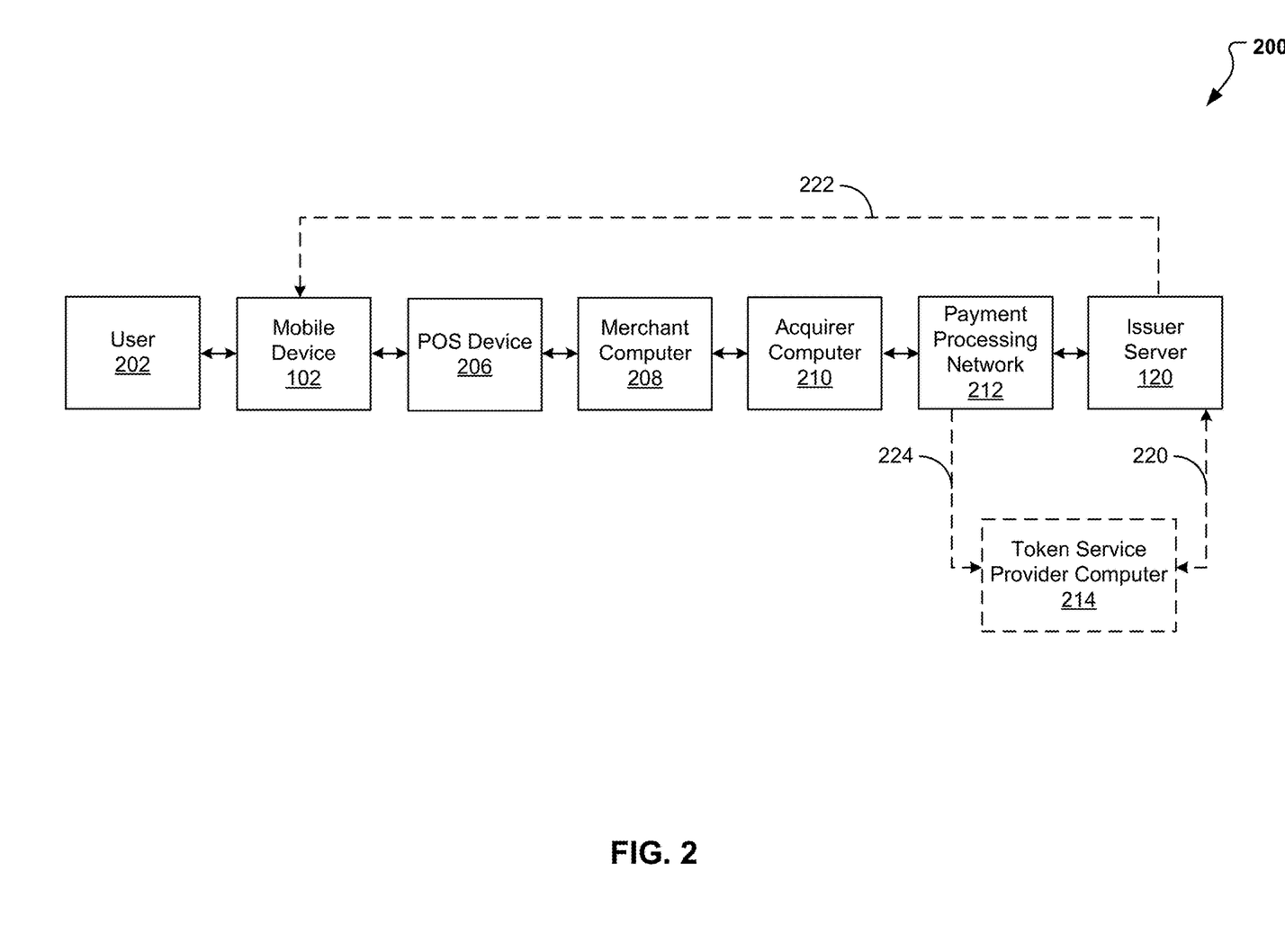
FIG. 2 is an is an example data flow diagram that illustrates a payment transaction system, according to an embodiment.

FIG. 2 illustrates a block diagram that depicts entities in a payment transaction system 200. The depicted payment transaction system 200 includes a user 202, the mobile device 102, a point-of-sale (POS) device 206, a merchant computer 208, an acquirer computer 210, a payment processing network 212, and the issuance computer 120.

The user 202 may operate the mobile device 102. For example, the user 202 may use the mobile device 102 to conduct a financial transaction (e.g., the payment transaction previously discussed with reference to FIG. 1). As used herein, a "merchant" is typically an entity that engages in transactions and may sell goods and/or service. An "issuer" may typically refer to a business entity (e.g., a bank) that maintains financial accounts for users and may issue payment instruments and/or payment credentials associated with payment instruments to be stored on the mobile device 120. An "acquirer" is typically a business entity (e.g., a bank) that has a business relationship with a particular merchant or other entity. In certain implementations, some entities may perform both issuer and acquirer functions. Each of the entities (e.g., merchant computer 208, acquirer computer 210, the payment processing network 212, and/or the issuance computer 120) may comprises one or more computer components to enable communications or to perform one or more of the functions described herein.

The payment processing network 212 may include data processing subsystems, networks, and operations used to support and deliver certificate authority services, authorization services, exception file services, and clearing and settlement services. In some embodiments, the payment processing network 212 may conduct transactions in substantially real-time (e.g., in fewer than a few seconds or fractions of a second). The payment processing network 212 may include one or more server computers and may use any suitable wired or wireless network, including the Internet.

According to certain embodiments, the user 202 may purchase a good or service from a merchant using the mobile device 102, which can interact with the POS device 206 at a merchant associated with the merchant computer 208. For instance, the user 202 may tap the mobile device 102 against an NFC reader included in the POS device 206. In other embodiments, the user 202 may indicate payment details to the merchant electronically, such as via a digital wallet and/or an online transaction. In some payment transactions, the mobile device 102 may not communicate with the POS device 206 and may instead communicate directly with a merchant computer 208.

As a result, a payment authorization request may be generated, either by the POS device 206 or the merchant computer 208 depending on how the mobile device indicates the payment details, as described above. In either scenario, the payment authorization request is forwarded to the acquirer computer 210, which as described below, ultimately receives the funds for the payment transaction from the issuer of the issuance server 120. According to some embodiments, the payment authorization request may comply with a message type defined by the International Organization for Standardization (ISO) 8583 standard. The payment authorization request may include an issuer account identifier that may be associated with a payment instrument issued by the issuer. In certain embodiments, in addition to or in place of the issuer account identifier, the payment authorization request may include a unique digital key that was generated by the mobile device 102 and a device identifier associated with the mobile device 102. The payment authorization request may also include other transaction information associated with the payment transaction including, but not limited to, a payment amount, a merchant identifier, merchant location information, and any other information that may be used to determine whether to identify and/or authorization the payment transaction.

Subsequent to receiving the payment authorization request, the acquirer computer 210 transmits the payment authorization request to the payment processing network 212. The payment processing network 212 in turn forwards the payment authorization request to the issuance server 120. The issuance server 120 then determines whether or not the payment transaction is authorized (e.g., as part of a payment authorization process) and transmits an indication of its decision back through the payment processing network 212.

In a typical transaction that involves using a token service provider (TSP), a TSP computer 214 provisions the issuer and by extension the mobile device 102 with a token prior to initiating the payment transaction. For example, the TSP server 214 may generate a token corresponding to a payment instrument issued by the issuer of the issuance server 120. The TSP server 214 also stores a mapping between the account number corresponding to the payment instrument and the token. At step 220, the TSP server 214 provides the token to the issuance server 120, which in turn forwards the token to the mobile device 102 at step 222.

As such, as part of initiating the payment transaction, the mobile device 102 may provide the token to the POS device 206 or the merchant computer 208. As a result, the generated payment authorization request may include the token, which is eventually forwarded to the payment processing network 212, as previously discussed. At step 224, the payment processing network 212 provides the TSP server 214, which matches the token with the appropriate account number of the corresponding payment instrument. The TSP server 214 then transmits the token and corresponding account number back to the issuance server 120 which performs the payment authorization process with respect to the account number.

However, embodiments described herein preclude the need for a token service provider computer. As previously described with reference to FIG. 1, the mobile device 102 is configured to generate a unique digital key based on the account number. The mobile device 102 then deletes the account number and transmits the unique digital key and a device identifier of the mobile device 102 directly to the issuance server 120. The issuance server 120 is configured to store a mapping between the unique digital key and the device identifier. As such, when the issuance server 120 subsequently receives the unique digital key as part of a payment transaction, the issuance server 120 can validate the unique digital key and device identifier pair with the stored mapping. The issuance server 120 is further configured to derive the account number from the unique digital key and perform the payment authorization process with respect to the account number. Thus, the account number is not stored at a third-party TSP computer, which may be vulnerable to theft in the case of an even that compromises the TSP computer's 214 security. Further, transmission of the account number between the TSP computer 214 and the issuance server 120 is avoided, which also reduces the likelihood that the account number can be stolen.

Figure 3:
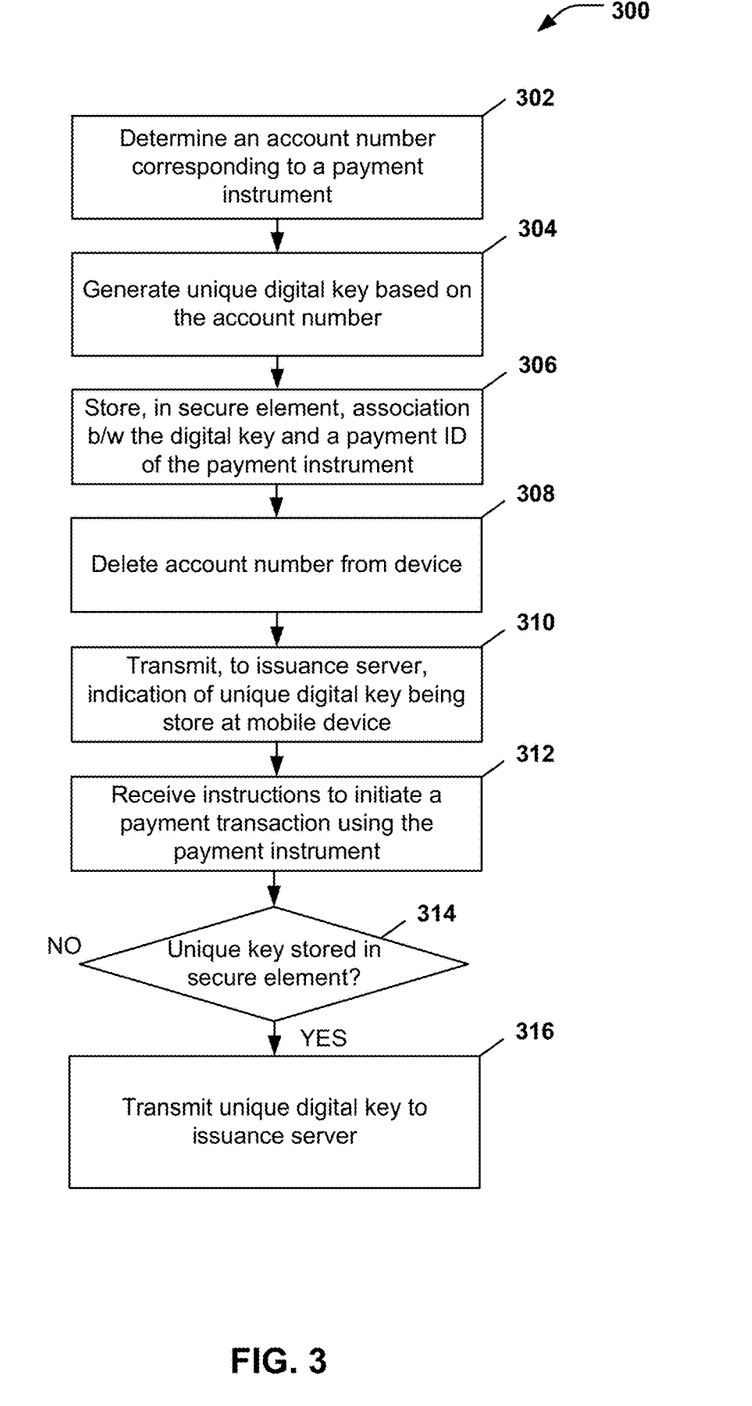
FIG. 3 is an example flow diagram for providing tokenization services at a mobile device, according to an embodiment.

FIG. 3 illustrates a flow diagram of a method 300 for providing tokenization services at a mobile device. Note that one or more steps, processes, and methods described herein may be omitted, performed in a different sequence, or combined as desired or appropriate.

The method 300 may begin at step 302, wherein a mobile device, such as mobile device 102 determines an account number corresponding to a payment instrument. As previously discussed, the mobile device 102 may capture an image of a payment instrument, such as a credit card, on which the account number is printed or otherwise made visible. The mobile device 102 may perform an image recognition process to determine the account number based on the captured image. In other embodiments, the account number may be directly provided to the mobile device 102, such as being input by a user of the mobile device.

At step 304, the mobile device 102 may generate a unique digital key based on the account number. For instance, the mobile device 102 may apply a transformation function to the account number to generate the unique digital key. At step 306, the mobile device 102 may store, in a secure element, an association between the unique digital key and a payment identifier associated with the payment instrument. Further, at step 308, the mobile device 102 may delete the account number, which may have been temporarily stored in memory when the mobile device initially determined the account number (e.g., via the image recognition process or otherwise). To this end, the mobile device 102 may identify the memory address range(s) that store the account number and overwrite the memory locations corresponding to the memory address range(s) with random data that is different from the account number.

At step 310, the mobile device 102 may transmit, to an issuance server such as issuance server 120, an indication of the unique digital key being stored at the mobile device 102. In certain implementations, the indication may also include a device identifier associated with the mobile device 102. At step 312, the mobile device 102 may receive instructions to initiate a payment transaction using the payment instrument for payment.

Figure 4:
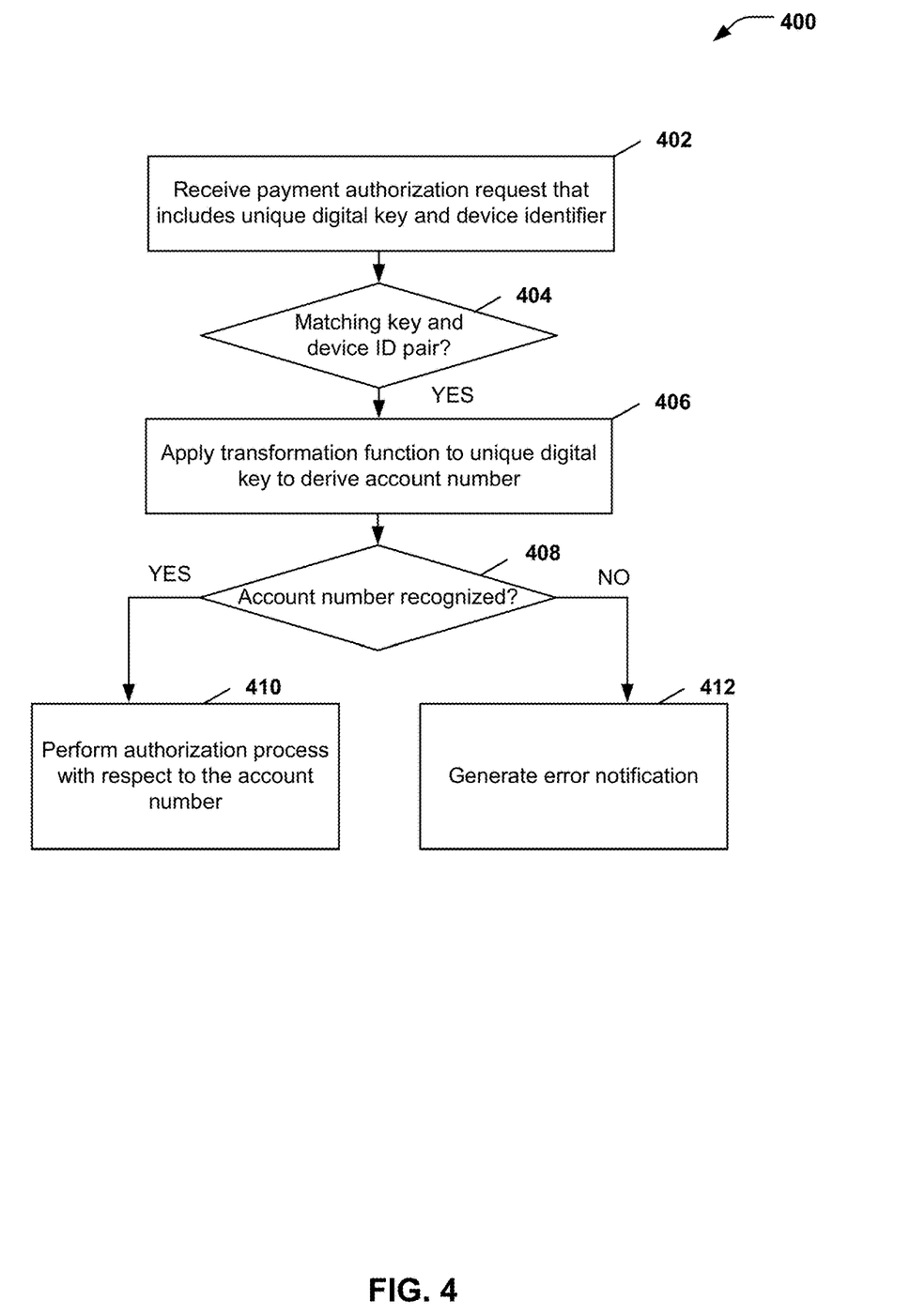
FIG. 4 is an example flow diagram that depicts operations of an issuance server, according to another embodiment.

FIG. 4 illustrates a flow diagram of a method 400 of operations performed by an issuance server in order to provide tokenization at a mobile device. Note that one or more steps, processes, and methods described herein may be omitted, performed in a different sequence, or combined as desired or appropriate.

The method 400 may begin in step 402, wherein an issuance server, such as issuance server 120, may receive a payment authorization request associated with a payment transaction corresponding to the mobile device 102 and/or a user of the mobile device 102. The payment authorization request may include a unique digital key a device identifier. As previously discussed, the unique digital key may have been previously generated by the mobile device 102 based on an account number of a payment instrument that is issued by the issuer of the issuance server 120. Additionally, the device identifier m may be associated with the mobile device 102.

At step 404, the issuance server 120 may determine whether its database 128 stores a matching unique digital key and device identifier set. If the issuance server 120 determines that there is no matching set, the issuance server 120 may return an error and transmit an error indication to the mobile device 102. Otherwise, the method 400 may proceed to step 406, where the issuance server 120 may derive, from the unique digital key, the account number associated with the payment instrument. The issue server 120 may derive the account number by applying a second transformation function to unique digital key that reverses the transformation function that was applied to the account number to initially generate the unique digital key.

At step 408, the issuance server 120 may determine whether the derived account number is recognized as a valid account number issued by the issuer. If so, the method 400 may proceed to step 410, where the issuance server performs an authorization process with respect to the account number and the payment transaction. Otherwise, at step 412, the issuance server 120 may generate an error notification and transmit the error notification to the mobile device 102.

Figure 5:
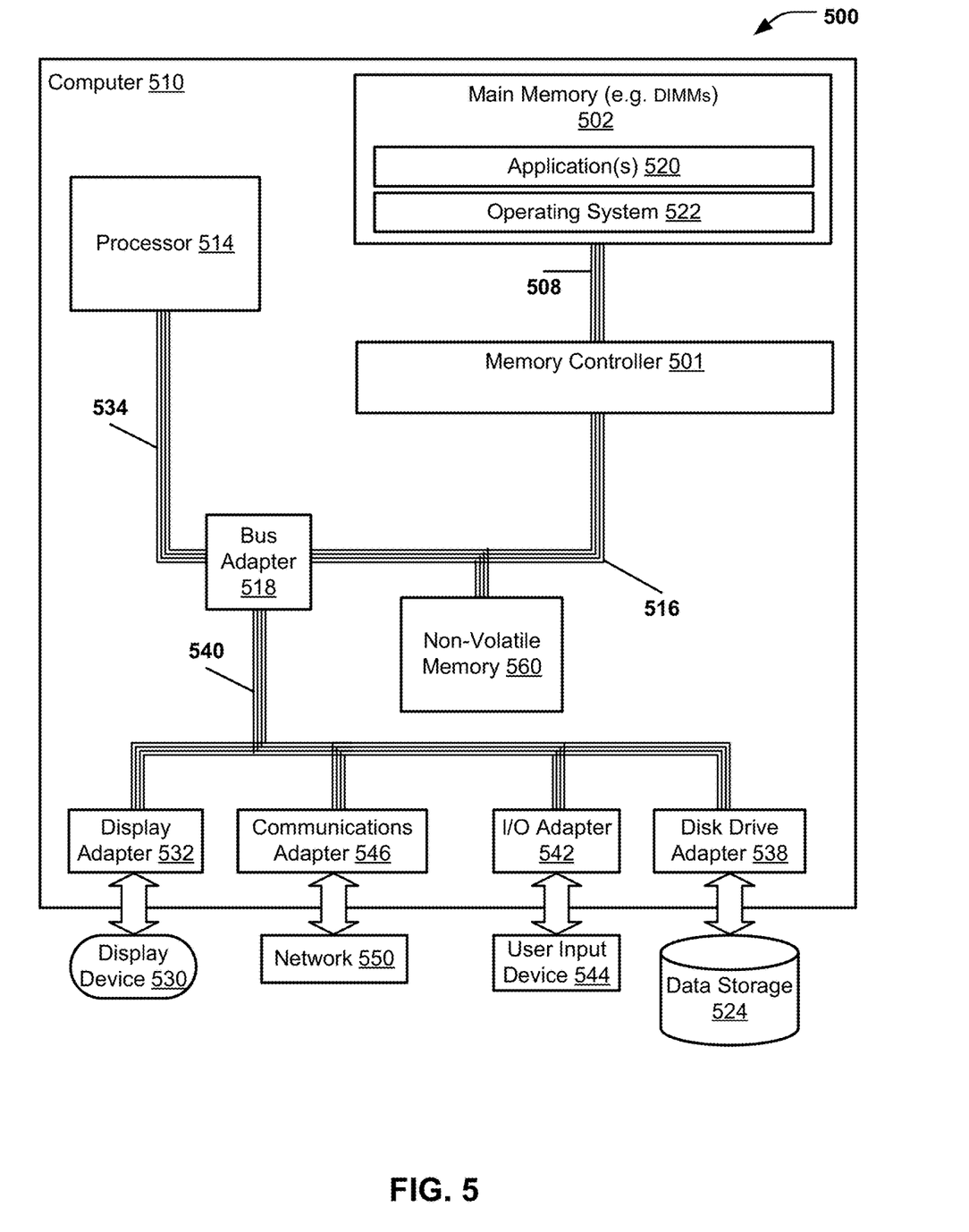
FIG. 5 is a block diagram of a computer system suitable for implementing one or more components in FIG. 1-4, according to an embodiment.

FIG. 5 is a block diagram of a computer system 500 suitable for implementing one or more components in FIG. 1 and/or FIG. 2, according to an embodiment. Referring to FIG. 5, an illustrative system 500 including a computer 510 is shown. The computer 510 may be an implementation of a computing system that includes or corresponds to the mobile device 102, the service provider server 114, the issuance server 120 of FIG. 1, and/or any of the entities (except the user 202) depicted in FIG. 2. The computer 510 includes at least one computer processor (CPU) 514 (e.g., a hardware processor) as well as main memory 502, a memory controller 501, and a non-volatile memory 560. The main memory 502 is connected through a memory bus 508 to the memory controller 501. The memory controller 501 and the non-volatile memory 560 are connected through a second memory bus 516 and a bus adapter 518 to the processor 514 through a processor bus 534.

Stored at the memory 502 are one or more applications 520 that may be module(s) or computer program instructions for carrying out particular tasks (e.g., the key management application 104, image recognition application 105, key management application 122, and/or payment authorization application 124 of FIG. 1). Also stored at the main memory 502 is an operating system 522. Operating systems include, but are not limited to, UNIX® (a registered trademark of The Open Group), Linux® (a registered trademark of Linus Torvalds), Windows® (a registered trademark of Microsoft Corporation, Redmond, Wash., United States), and others as will occur to those of skill in the art. The operating system 522 and the application 520 in the example of FIG. 5 are shown in the main memory 502, but components of the aforementioned software may also, or in addition, be stored at non-volatile memory (e.g., on data storage, such as data storage 524 and/or the non-volatile memory 560).

The computer 510 includes a disk drive adapter 538 coupled through an expansion bus 540 and the bus adapter 518 to the processor 514 and other components of the computer 510. The disk drive adapter 538 connects non-volatile data storage to the computer 510 in the form of the data storage 524 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art. In a particular embodiment, the data storage 524 may store the data and information described herein.

The computer 510 also includes one or more input/output ("I/O") adapters 542 that implement user-oriented input/output through, for example, software drivers and computer hardware for controlling input and output to and from user input devices 544, such as keyboards and mice. In addition, the computer 510 includes a communications adapter 546 for data communications with a data communications network 560. The data communications may be carried out serially through Recommended Standard 232 (RS-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 546 implements the hardware level of data communications through which one computer sends data communications to another computer, directly or through a data communications network. Examples of the communications adapter 546 suitable to use in the computer 510 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer 510 also includes a display adapter 532 that facilitates data communication between the bus adapter 518 and a display device 530, enabling the application 520 to visually present output on the display device 530.

In various embodiments of the present disclosure, execution of instruction sequences to practice the present disclosure may be performed by computer system 500. In various other embodiments of the present disclosure, a plurality of computer systems 500 coupled by communications adapter 546 to the network (e.g., such as a LAN, WLAN, and/or various other wired or wireless networks, including telecommunications, mobile, and cellular phone networks) may perform instruction sequences to practice the present disclosure in coordination with one another.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium or storage device and executed by a processor that includes but is not limited to firmware, resident software, microcode, etc.

Further, embodiments of the present disclosure, may take the form of a computer program product accessible from a computer-usable or computer-readable storage device providing program code (e.g., computer-executable instructions) for use by or in connection with a computer, processor, or any instruction execution system. For the purposes of this description, a computer-usable or computer-readable storage device may be non-transitory and can be any apparatus that can tangibly embody a computer program and that can contain, store, communicate, propagate, or transport the program for use by or in connection with the instruction execution system, processor, apparatus, or device.

In various embodiments, the medium can include an electronic, magnetic, optical, electromagnetic, infrared, or semiconductor system (or apparatus or device) or a propagation medium. Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A mobile device, comprising:
one or more hardware processors;
a data storage device;
a secure element; and
a non-transitory memory storing computer-executable instructions, that in response to execution by the one or more hardware processors, causes the mobile device to perform operations comprising:
determining an account number corresponding to a payment instrument associated with a user account;
generating a unique digital token by inputting the account number to a transformation function that outputs a hash based on the account number, the unique digital token being the hash and usable for identifying the account number during a payment through a reverse transformation function;
storing an association between the unique digital token and a payment identifier corresponding to the payment instrument in the secure element of the mobile device;
deleting the account number from the mobile device by identifying a memory address range of the data storage device that corresponds to a location where the account number is temporarily stored and overwriting the memory address range with randomly generated data that is different than the account number;
transmitting, to an issuance server associated with an issuer of the payment instrument, an indication of the unique digital token being stored at the mobile device;
subsequent to the transmitting, receiving instructions to initiate a payment transaction using the payment instrument associated with the user account;
based on the instructions, determining, by accessing the secure element of the mobile device, the association between the unique digital token and the payment identifier; an transmitting the unique digital token to the issuance server for payment of the payment transaction, the transmitting of the unique digital token causing the issuance server to authorize payment using the account number corresponding to the payment instrument.

2. The mobile device of claim 1, wherein the transmitting the indication of the unique digital token being stored at the mobile device further comprises:
transmitting a device identifier associated with the mobile device to the issuance server, thereby causing the issuance server to derive the account number of the payment instrument from the unique digital token and to store an association between the device identifier, the unique digital token, and the account number.

3. The mobile device of claim 1, wherein the payment instrument corresponds to a credit card and the account number corresponds to a credit card number.

4. The mobile device of claim 1, wherein the causing the issuance server to authorize payment comprises:
causing the issuance server to derive the account number based on the reverse transformation function.

5. The mobile device of claim 1, wherein the operations further comprise:
receiving, from the issuance server, a request to authorize a second device to store the unique digital token associated with the payment instrument; and
transmitting an authentication request to the second device.

6. The mobile device of claim 1, wherein the transmitting the unique digital token to the issuance server includes a device identifier associated with the mobile device and causes the issuance server to derive the account number of the payment instrument from the unique digital token.

7. The mobile device of claim 1, further comprising an image capture device, wherein the determining the account number comprises:
accessing an image of the payment instrument captured via the image capture device; and
determining the account number based on the image of the payment instrument.

8. A method, comprising:
determining, by a mobile device, an account number corresponding to a payment instrument associated with a user account;
generating, by the mobile device, a unique digital token by inputting the account number to a transformation function that outputs a hash based on the account number, the unique digital token being the hash and usable for identifying the account number during a payment through a reverse transformation function;
storing, by the mobile device, an association between the unique digital token and a payment identifier corresponding to the payment instrument in a secure element included in the mobile device;
deleting, by the mobile device, the account number from the mobile device by identifying a memory address range of a data storage device of the mobile device that corresponds to a location where the account number is temporarily stored and overwriting the memory address range with randomly generated data that is different than the account number;
transmitting, by the mobile device, to an issuance server associated with an issuer of the payment instrument, an indication of the unique digital token being stored at the mobile device;

subsequent to the transmitting, receiving, by the mobile device, instructions to initiate a payment transaction using the payment instrument associated with the user account;

based on the instructions, determining, by the mobile device accessing the secure element of the mobile device, the association between the unique digital token and the payment identifier; and transmitting, by the mobile device, the unique digital token to the issuance server for payment of the payment transaction, the transmitting of the unique digital token causing the issuance server to authorize payment using the account number corresponding to the payment instrument.

9. The method of claim 8, wherein the transmitting the indication of the unique digital token being stored at the mobile device further comprises:

transmitting, from the mobile device to the issuance server, a device identifier associated with the mobile device, thereby causing the issuance server to derive the account number of the payment instrument from the unique digital token and to store an association between the device identifier, the unique digital token, and the account number.

10. The method of claim 8, wherein the payment instrument corresponds to a credit card and the account number corresponds to a credit card number.

11. The method of claim 8, wherein the causing the issuance server to authorize payment comprises:

causing the issuance server to derive the account number based on the transformation function.

12. The method of claim 8, further comprising:

receiving, by the mobile device and from the issuance server, a request to authorize a second device to store the unique digital token associated with the payment instrument; and transmitting an authentication request to the second device.

13. The method of claim 8, wherein the transmitting the unique digital token to the issuance server includes a device identifier associated with the mobile device and causes the issuance server to derive the account number of the payment instrument from the unique digital token.

14. The method of claim 8, further comprising:

accessing an image of the payment instrument captured via an image capture device installed on the mobile device; and determining, by the mobile device, the account number based on the image of the payment instrument.

15. A non-transitory computer-readable medium storing computer-executable instructions, that in response to being executed by one or more hardware processors of a mobile device, causes the one or more hardware processors to perform operations comprising:

determining an account number corresponding to a payment instrument associated with a user account;

generating a unique digital token by inputting the account number to a transformation function that outputs a hash based on the account number, the unique digital token being the hash and usable for identifying the account number during a payment through a reverse transformation function;

storing an association between the unique digital token and a payment identifier corresponding to the payment instrument in a secure element included in the mobile device;

deleting the account number from the mobile device by identifying a memory address range of a data storage device of the mobile device that corresponds to a location where the account number is temporarily stored and overwriting the memory address range with randomly generated data that is different than the account number;

transmitting, to an issuance server associated with an issuer of the payment instrument, an indication of the unique digital token being stored at the mobile device;

subsequent to the transmitting, receiving instructions to initiate a payment transaction using the payment instrument associated with the user account;

based on the instructions, determining, by accessing the secure element, the association between the unique digital token and the payment identifier; and transmitting the unique digital token to the issuance server for payment of the payment transaction, the transmitting of the unique digital token causing the issuance server to authorize payment using the account number corresponding to the payment instrument.

16. The mobile device of claim 1, wherein the payment identifier comprises a logo associated with the issuance server.

17. The mobile device of claim 1, wherein the transmitting the unique digital token to the issuance server for payment of the payment transaction is performed through a payment network.

18. The method of claim 8, wherein the transmitting the unique digital token to the issuance server for payment of the payment transaction is performed through a payment network.

19. The non-transitory computer-readable medium of claim 15, wherein the transmitting the unique digital token to the issuance server for payment of the payment transaction is performed through a payment network.

20. The non-transitory computer-readable medium of claim 15, wherein the payment instrument corresponds to a credit card and the account number corresponds to a credit card number.

* * * * *

UNITED STATES PATENT AND TRADEMARK OFFICE
CERTIFICATE OF CORRECTION

| | | |
|---|---|---|
| PATENT NO. | : 10,997,594 B2 | Page 1 of 1 |
| APPLICATION NO. | : 16/021946 | |
| DATED | : May 4, 2021 | |
| INVENTOR(S) | : Srinivasan Rangaraj | |

It is certified that error appears in the above-identified patent and that said Letters Patent is hereby corrected as shown below:

In the Claims

In Column 13, Line 67, change "an" to --and--

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*